United States Patent
Deguchi et al.

(10) Patent No.: US 8,064,465 B2
(45) Date of Patent: Nov. 22, 2011

(54) PACKET FORWARDING APPARATUS

(75) Inventors: Masaki Deguchi, Kanazawa (JP); Akira Miyasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 668 days.

(21) Appl. No.: 11/482,883

(22) Filed: Jul. 7, 2006

(65) Prior Publication Data

US 2007/0047546 A1 Mar. 1, 2007

(30) Foreign Application Priority Data

Sep. 1, 2005 (JP) ................. 2005-254010

(51) Int. Cl.
*H04L 12/28* (2006.01)
*H04L 12/56* (2006.01)
*H04J 3/16* (2006.01)
*H04J 3/22* (2006.01)

(52) U.S. Cl. ............... 370/395.6; 370/395.65; 370/466

(58) Field of Classification Search .................. None
See application file for complete search history.

(56) References Cited

U.S. PATENT DOCUMENTS

| | | | | |
|---|---|---|---|---|
| 6,070,187 A | * | 5/2000 | Subramaniam et al. ...... | 709/220 |
| 2002/0174251 A1 | * | 11/2002 | Lasserre ...................... | 709/249 |
| 2004/0184408 A1 | * | 9/2004 | Liu et al. ...................... | 370/236 |
| 2004/0202199 A1 | * | 10/2004 | Fischer et al. ................ | 370/474 |
| 2004/0252717 A1 | * | 12/2004 | Solomon et al. .............. | 370/466 |
| 2005/0169279 A1 | * | 8/2005 | Magd et al. ................. | 370/395.5 |
| 2006/0187856 A1 | * | 8/2006 | Booth et al. .................. | 370/254 |

FOREIGN PATENT DOCUMENTS

| | | |
|---|---|---|
| JP | 2002-016640 | 1/2002 |
| JP | 2002-247089 | 8/2002 |
| JP | 2002-290399 | 10/2002 |
| WO | WO 01/80493 | 10/2001 |
| WO | WO 02/15469 | 2/2002 |

* cited by examiner

*Primary Examiner* — Daniel J Ryman
*Assistant Examiner* — Christopher Crutchfield
(74) *Attorney, Agent, or Firm* — Katten Muchin Rosenman LLP

(57) ABSTRACT

In a virtual LAN, a packet forwarding apparatus forwards IP packets and L2 packets using a single switch. The packet forwarding apparatus includes a switch that switches a media access control (MAC) packet using a MAC address of the MAC packet, and a packet format converter. The packet format converter converts a packet from an input and output unit into a packet having a MAC address according to information from the input and output unit, and converts a packet output from the switch to the input and output unit to a packet format compatible with the input and output unit according to the information of the input and output unit.

4 Claims, 18 Drawing Sheets

PVC management information table

| No | VP# | VC# | Accommodated User type | VLAN# | MAC address (source port) | MAC address (destination port) |
|----|-----|-----|------------------------|-------|---------------------------|--------------------------------|
| 1  | 22  | 1   | Bridged                | 100   | —                         | —                              |
| 2  | 22  | 2   | Routed                 | 200   | 00:00:55:40:00:01         | 00:00:aa:bb:00:02              |
| 3  | 23  | 1   | Routed                 | 250   | 00:00:55:40:00:01         | 00:00:aa:bb:00:03              |
| .. | ..  | ..  | ..                     | ..    | ..                        | ..                             |
| n  | 3   | 5   | Routed                 | 200   | 00:00:55:40:00:01         | 00:00:aa:cc:00:04              |

Manual setting by administrator · Each physical ports automatic setting · Each PVCs automatic setting Port by Port automatic determinating in system

Fig.5

PVC management information table

| No | VP# | VC# | Accommodated User type | VLAN# | MAC address (source port) | MAC address (destination port) |
|---|---|---|---|---|---|---|
| 1 | 22 | 1 | Bridged | 100 | — | — |
| 2 | 22 | 2 | Routed | 200 | 00:00:55:40:00:01 | 00:00:aa:bb:00:02 |
| 3 | 23 | 1 | Routed | 250 | 00:00:55:40:00:01 | 00:00:aa:bb:00:03 |
| .. | .. | .. | .. | .. | .. | .. |
| n | 3 | 5 | Routed | 200 | 00:00:55:40:00:01 | 00:00:aa:cc:00:04 |

Manual setting by administrator — Each physical port setting / Each PVC setting

Fig.9

PVC management information table

| No | VP# | VC# | Accommodated User type | VLAN# | MAC address (source port) | MAC address (destination port) |
|---|---|---|---|---|---|---|
| 1 | 22 | 1 | Bridged | 100 | — | — |
| 2 | 22 | 2 | Routed | 200 | 00:00:55:40:00:01 | 00:00:aa:bb:00:02 |
| 3 | 23 | 1 | Routed | 250 | 00:00:55:40:00:01 | 00:00:aa:bb:00:02 |
| .. | .. | .. | .. | .. | .. | .. |
| n | 3 | 5 | Routed | 200 | 00:00:55:40:00:01 | 00:00:aa:cc:00:02 |

System lump setting / Each PVCs setting

Manual setting by administrator

Fig.13

PVC management information table

| No | VP# | VC# | Accommodated User type | VLAN# | MAC address (source port) | MAC address (destination port) |
|---|---|---|---|---|---|---|
| 1 | 22 | 1 | Bridged | 100 | — | — |
| 2 | 22 | 2 | Routed | 200 | 00:00:55:40:00:01 | 00:00:55:40:00:02 |
| 3 | 23 | 1 | Routed | 250 | 00:00:55:40:00:01 | 00:00:55:40:00:02 |
| .. | .. | .. | .. | .. | .. | .. |
| n | 3 | 5 | Routed | 200 | 00:00:55:40:00:01 | 00:00:55:40:00:02 |

{ Manual setting by administrator }  
{ System lump setting }  
{ Obtaining by ARP each PVCs }

Opposing side IP address information

| 172.168.25.1 |
|---|

{ Each physical port setting — Manual setting by administrator }

Fig.16

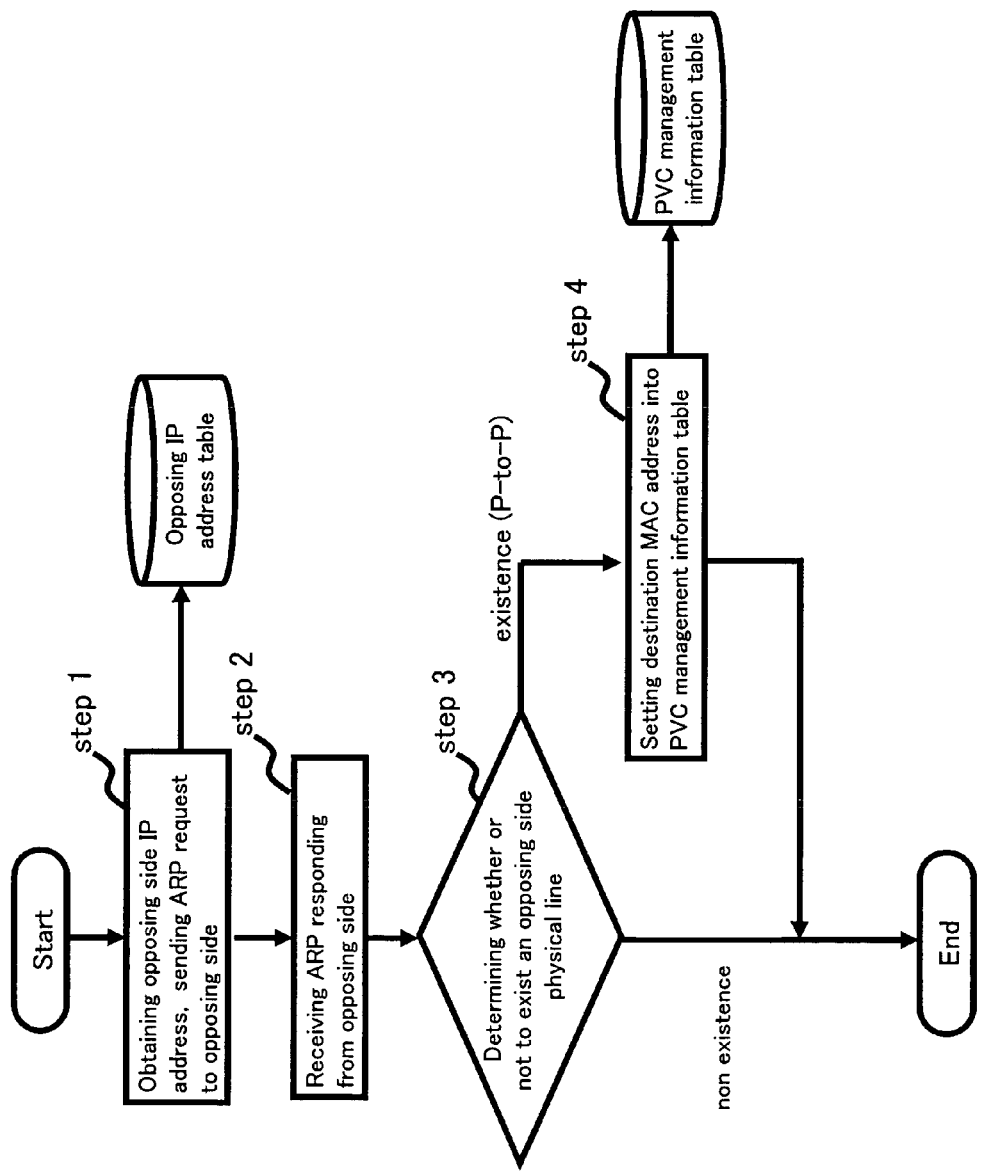

US 8,064,465 B2

PACKET FORWARDING APPARATUS

BACKGROUND OF THE INVENTION

1. Field of the Invention

The present invention relates to systems that establish virtual private net LANs or virtual private networks (VPNs).

2. Description of the Related Art

FIG. 1 shows a system configuration of the related art. A long distance carrier 1 includes a system capable of providing a VPN. VPNs include internet protocol virtual privet networks (IP-VPN) and Layer-2 virtual local area networks (L2-VLAN).

The IP-VPNs may use at least layer 3 protocol for example internet protocol. The L2-VLANs may use Layer-2 protocol. L2-VPNs are also referred to as Layer-2 virtual local area networks (L2-VLANs).

A system established an L2-VPN uses a media access control (MAC) address for forwarding a packet. The packet has a frame structure, including a destination MAC address and a source MAC address. A MAC address is also referred to as a physical address.

A physical address is recorded on a LAN card to be connected to a personal computer (PC) when the LAN card is manufactured, and is typically composed of 48 bits.

IP has IP addresses to be processed at layer 3 or higher. An example IP datagram is composed of about 1,500 bytes, and includes a source IP address (source network address) and a destination IP address (destination network address) each of 32 bits.

Referring to FIG. 1, the long-distance carrier 1 provides services via an IP-VPN and an L2-VPN in combination.

A packet forwarding service via the L2-VPN is indicated by a dotted line, and a service via the IP-VPN is indicated by a two-dot chain line.

An asynchronous transfer mode (ATM) access network 3-1 that is owned by a local carrier 3 is established between customers (end users) 2-1 and 2-2 and the long-distance carrier 1. The long-distance carrier 1 accesses the ATM access network 3-1 via a carrier-to-carrier access point (POI) 3-2.

Thus, the long-distance carrier 1 needs to provide the L2-VPN and L3-VPN services via the network owned by the local carrier 3.

Since the ATM access network 3-1 of the local carrier 3 is of a type different from an L2-VPN network 1-8 that is owned by the long-distance carrier 1, it is necessary to forward a packet according to an ATM protocol different from that of the long-distance carrier 1.

When a user establishes a virtual private network, there is a need for a communications common carrier (e.g., an Internet service provider (ISP)) to forward a packet according to the individual protocols depending on the system of the user.

The ATM cell transmission system encapsulates an IP datagram or Ethernet datagram into an ATM cell (hereinafter referred to as an "ATM packet"). The ATM cell transmission system transmits the ATM packet, thereby forwarding data.

A metropolitan network (metro network) 1-9 includes add-drop multiplexers (ADMs) 1-1a and 1-1b. In general, metro networks are bi-directional ring/loop networks.

The ADM 1-1a transmits an ATM packet forwarded via the POI 3-2 to the ADM 1-1b via the metro network 1-9 using a synchronous multiplexing scheme, such as a SONET (synchronous optical network) or SDH (synchronous digital hierarchy) scheme.

The ADM 1-1a also forwards L2 and IP packets that are synchronously multiplexed and transmitted from the ADM 1-1b to the ATM access network 3-1 via the POI 3-2.

The ADM 1-1b synchronously multiplexes and transmits L2 and IP packets from an L2 switch (L2-SW) 1-2 and an L3 switch (L3-SW) 1-3 to the ADM 1-1a, and forwards the ATM packet from the ADM 1-1a to the L2-SW 1-2 and the L3-SW 1-3.

The L2-SW 1-2 converts the ATM packet from the ADM 1-1b into an L2 packet, and forwards the L2 packet to a path with a destination address.

The L2-SW 1-2 also forwards an L2 packet to the ADM 1-1b, the packet forwarded from an edge switch 1-6. The edge switch 1-6 is positioned at an end of the L2-VPN network 1-8, and is adapted to bridge L2 packets.

Bridging (bridge) is a relaying function for interconnecting networks, and is a function for relaying a frame by identifying a MAC address of a PC or the like in the MAC layer of Layer 2. In other words, the bridging function is a frame distributing function at the Layer-2 level.

A frame transmitted or received at Layer 2 does not represent an IP address, and is thus transmitted or received only using a MAC address (physical address).

Specifically, a frame transmitted or received at Layer 2 is constantly processed by using a MAC address.

Thus, a bridging apparatus implementing a bridging function manages a MAC address, a VLAN number, and a port number (indicating a forwarding port of the MAC address) to realize the bridging function.

The L3-SW 1-3 picks it up an IP packet from the ATM packet, the ATM packet from the ADM 1-1b, and forwards the IP packet to a path having a destination address.

The L3-SW 1-3 also forwards an IP packet to the ADM 1-1b the IP packet forwarded from an edge router 1-5. The edge router 1-5 is positioned at an end of the IP-VPN network 1-7, and is adapted to perform IP routing on IP packets.

IP routing (routing) is a function for determining a suitable forwarding route from among a plurality of routes to a final goal (destination) such as another network system or a gateway server.

In other words, the routing function is an IP datagram distributing function primarily at the Layer-3 level (Layer 3).

Unlike the bridging apparatus, a routing apparatus (such as a routing modem) is not adapted to manage MAC addresses in layer 2, but is adapted to manage only IP data grams.

In FIG. 1, routing and bridging are separately accommodated by different apparatuses, and two apparatuses are therefore illustrated. Japanese lid open Patent Publication No. 2002-290399 discloses an arrangement in which input and output interfaces of such two apparatuses are shared.

As in the arrangement shown in FIG. 1, when an L2-VPN user and an IP-VPN user are accommodated by different apparatuses, two packet forwarding apparatuses are needed, thus increasing the cost of the apparatuses. Moreover, two lines for connecting the ADMs and the packet forwarding apparatuses are also needed to support the two packet forwarding apparatuses, leading to high line leasing cost.

The packet forwarding apparatus includes only a device for performing bridging at an L2-SW and a device for performing routing at an L3-SW, and, due to its dual-switching function, becomes costly.

SUMMARY OF THE INVENTION

One embodiment, a packet forwarding apparatus for forwarding a packet, the packet transfer apparatus comprises a plurality of input-output ports, a switch and a packet changing means. The plurality of input-output ports have an input port and an output port. The switch switches the packet from the input port to the output port in accordance with a media access control address of the packet. The packet changing means is positioned between at least one of the input-output port and the switch, the packet changing means changes packet from the input port to the switch into a first format with a media accesses control address in accordance with the input ports, and the packet changing means changes the packet from the switch to the output port into a second format in accordance with the output ports.

Other embodiment, a packet forwarding apparatus for transmitting a packet, the packet transfer apparatus comprises a plurality of input-output port, a switch and a packet changing means. The plurality of input-output ports have an input ports and an output port. The switch switches the packet from the input port to the output port in accordance with media access control address of the packet. The packet changing means positioned between the input port and the switch, the packet changing means change the packet from the input port to the switch into a format with a media accesses control address in accordance with the input ports.

Other embodiment, a packet forwarding apparatus for transmitting a packet, the packet transfer apparatus comprises a plurality of input-output port, a switch and a packet changing means. The plurality of input-output ports have an input ports and an output port. The switch switches the packet from the input port to the output port in accordance with media access control address of the packet. The packet changing means is positioned between the output port and the switch, and the packet changing means changing the packet from the switch to the output port into a format in accordance with the output ports.

BRIEF DESCRIPTION OF THE DRAWINGS

FIG. 5 is a PVC management information table according to the first embodiment;

FIG. 9 is a PVC management information table according to the second embodiment;

FIG. 13 is a PVC management information table according to the third embodiment;

FIG. 16 is a PVC management information table according to the fourth embodiment;

FIG. 18 is a flowchart showing a process for creating a PVC management information table according to the fourth embodiment.

DESCRIPTION OF THE PREFERRED EMBODIMENTS

Figure 1:
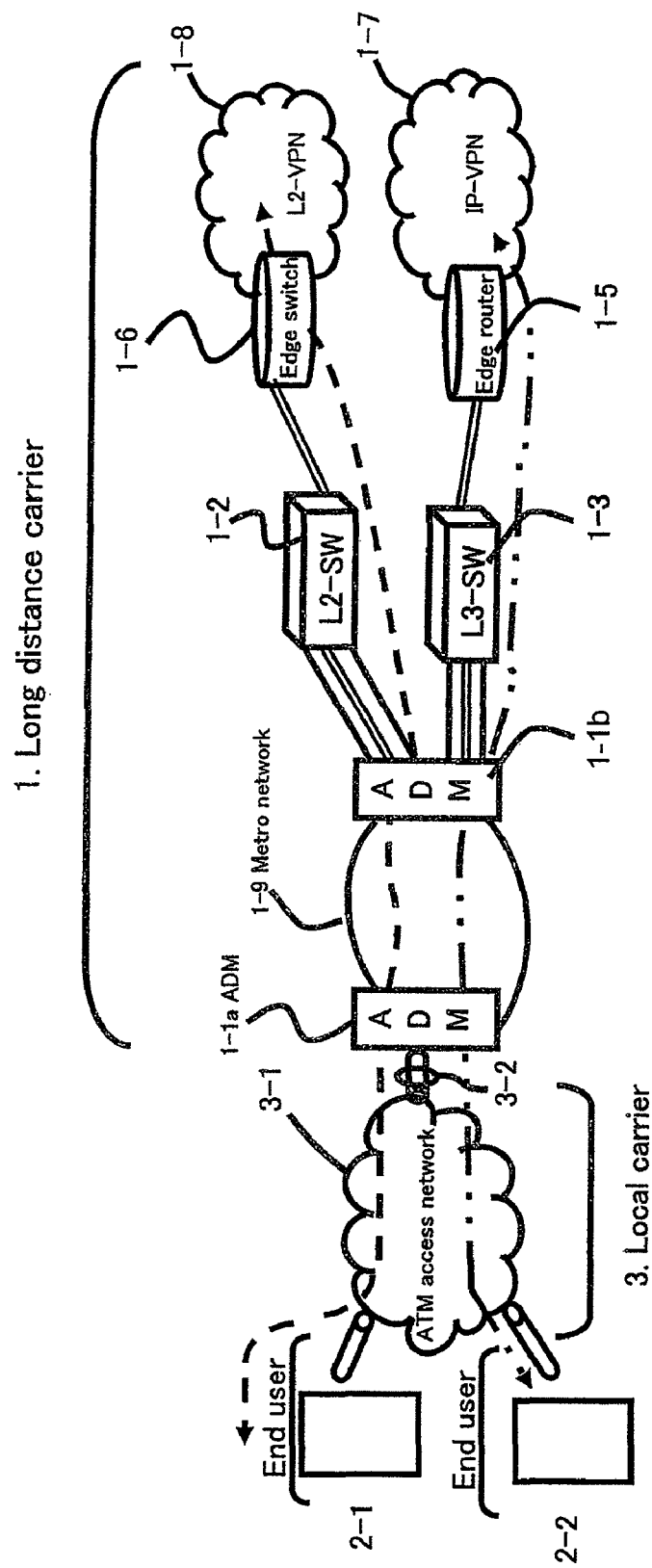
FIG. 1 is a diagram showing a system configuration of the related art.
Figure 2:
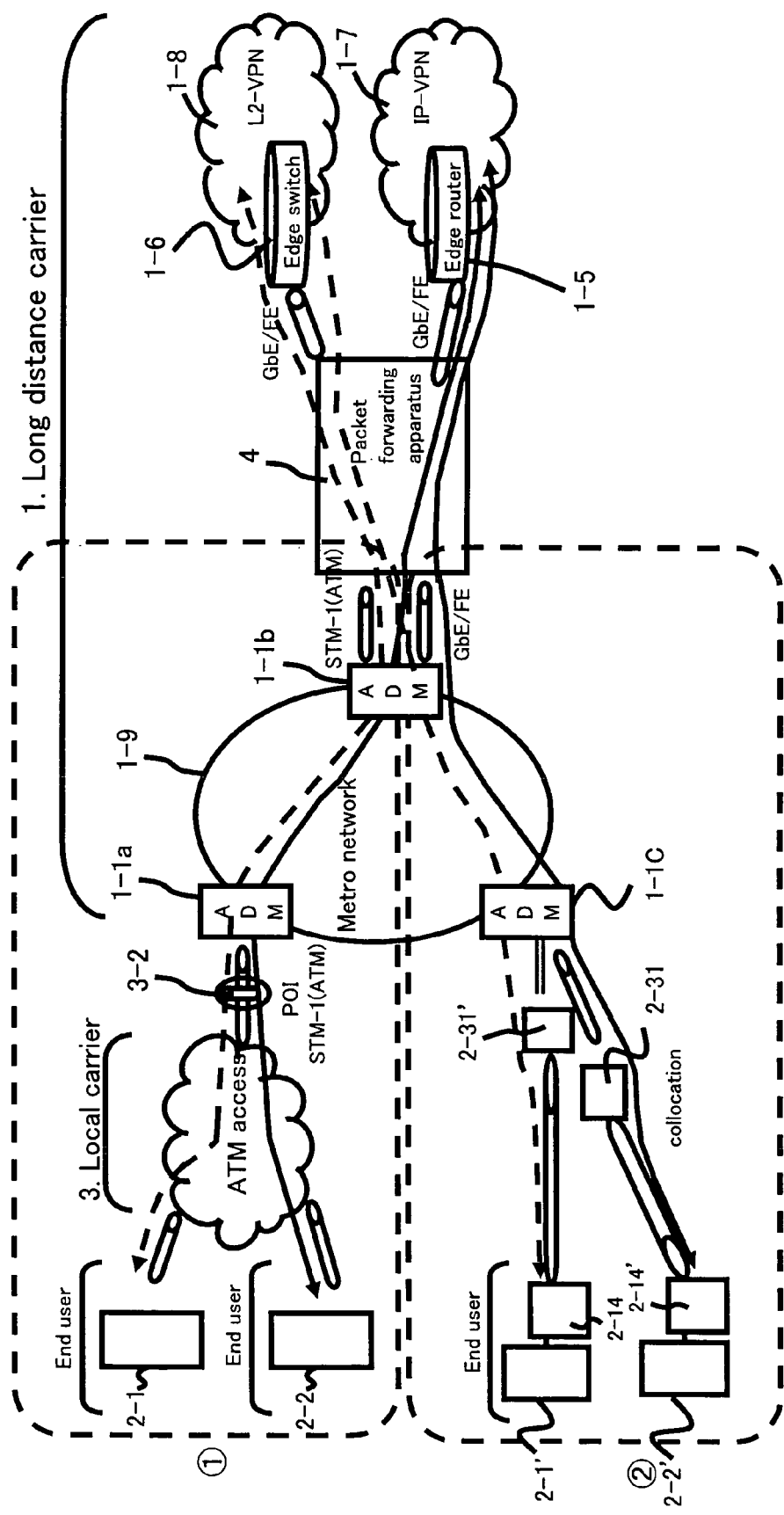
FIG. 2 is a diagram generally showing a system according to an embodiment of the present invention.

FIG. 2 generally shows a system according to an embodiment of the present invention. In FIG. 2, two mechanisms are illustrated. That is, end users use L2-VPN and IP-VPN networks at a long-distance carrier 1 via a local carrier 3, and the placement of communications equipment or information originating servers of end users at an office of the long-distance carrier 1, called collocation, allows the end users to use L2-VPN and IP-VPN networks at the long-distance carrier 1 without intervention of the local carrier 3.

End users 2-1 and 2-2 connected to an ADM 1-1a on a metro network 1-9 that is owned by the long-distance carrier 1 via an ATM access network 3-1 of the local carrier 3 and an access point POI 3-2.

End users 2-1' and 2-2' use media converters 2-14 and 2-14' to extend the packet forwarding distance, and forward packets to collocation facilities 2-31 and 2-31', respectively. The collocation facilities 2-31 and 2-31' are located upstream of an ADM 1-1c on the metro network 1-9 owned by the long-distance carrier 1.

Although the collocation facilities 2-31 and 2-31' are located upstream of the ADM 1-1c in FIG. 2, they may locate upstream of a packet forwarding apparatus 4 and may access the packet forwarding apparatus 4 via physical lines. If the end users 2-1' and 2-2' are physically accessible to the packet forwarding apparatus 4, the end users 2-1' and 2-2' may directly access the packet forwarding apparatus 4 without the intervention of the media converters 2-14 and 2-14' and the collocation facilities 2-31 and 2-31'.

An ADM 1-1b located on the metro network 1-9 is connected to the packet forwarding apparatus 4 via an ATM-protocol physical line STM-1 and an Ethernet line GbE/FE.

The packet forwarding apparatus 4 is connected to the ADM 1-1b, an edge switch 1-6, and an edge router 1-5 via physical lines.

The edge switch 1-6 is connected to an L2-VPN network 1-8 and the packet forwarding apparatus 4 via physical lines. The edge switch 1-6 is located at an interface between the L2-VPN network 1-8 and another network for performing L2-switching.

The edge router 1-5 is connected to an IP-VPN network 1-7 and the packet forwarding apparatus 4 via physical lines. The edge router 1-5 is located at an interface between the IP-VPN network 1-7 and another network for performing IP-routing.

The end users 2-1 and 2-1' transmit and receive L2-protocol packets.

The packets from the end users 2-1 and 2-1' are forwarded along routes indicated by dotted lines.

Specifically, a packet from the end user 2-1 or 2-1' is transferred to the metro network 1-9 via the local carrier 3 or the collocation facility 2-31', and the transferred packet is L2-switched in the packet forwarding apparatus 4, is sent to the L2-VPN network 1-8 via the edge switch 1-6.

Packets from the L2-VPN network 1-8 are forwarded along reverse routes to those along which the packets from the end users 2-1 and 2-1' are forwarded.

Packets from the end users 2-2 and 2-2' are forwarded along routes indicated by solid lines.

Specifically, a packet from the end user 2-2 or 2-2' is transferred to the metro network 1-9 via the local carrier 3 or the collocation facility 2-31 and the media converter 2-14', and the transferred packet is L2-switched in the packet forwarding apparatus 4, is sent to the IP-VPN network 1-7 via the edge router 1-5.

Packets from the IP-VPN network 1-7 are forwarded along reverse routes to those along which the packets from the end users 2-2 and 2-2' are forwarded.

Figure 3:
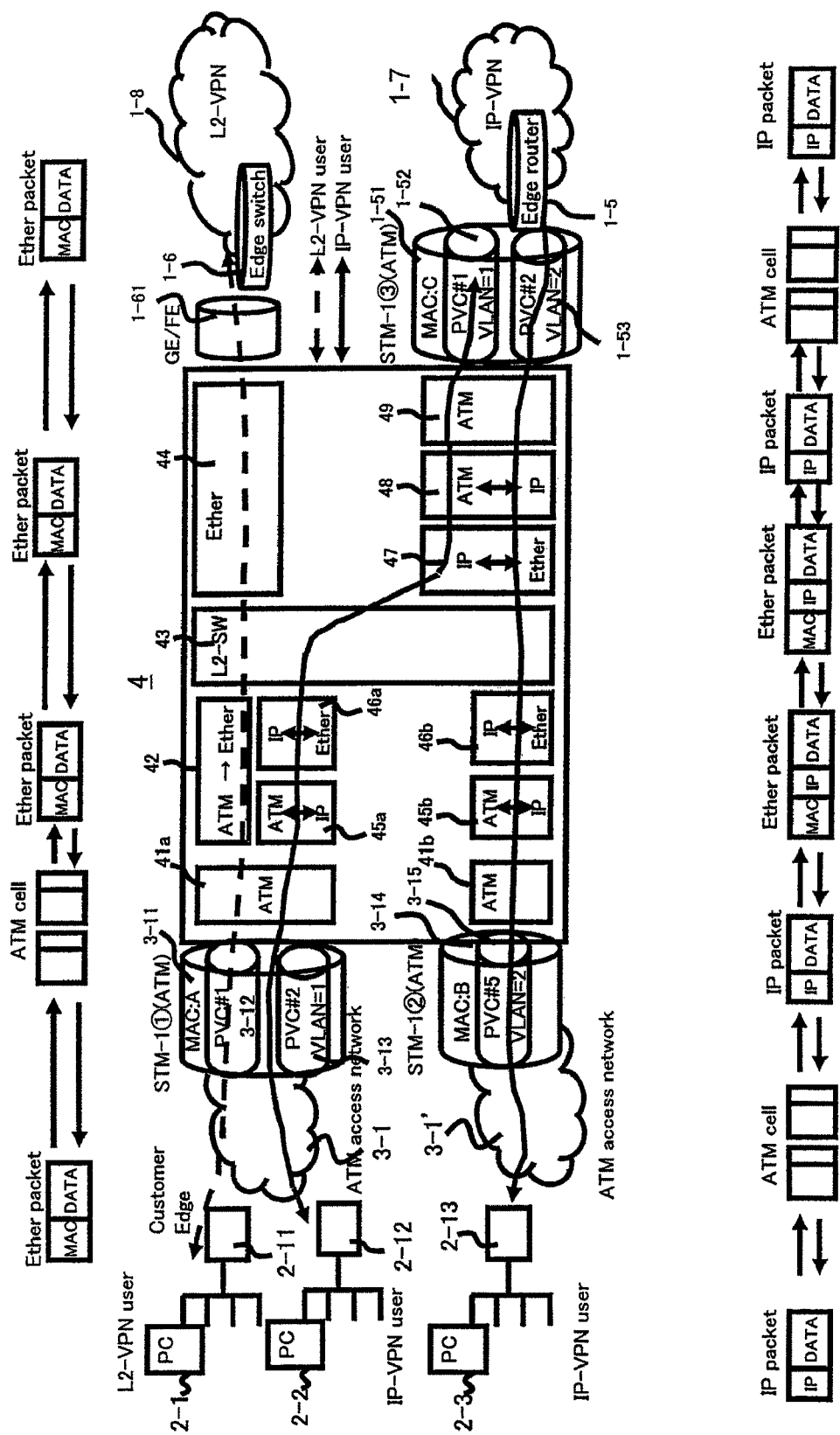
FIG. 3 is a diagram showing the flow of packets according to a first embodiment of the present invention.

FIG. 3 shows the flow of packets forwarded in a packet forwarding apparatus according to a first embodiment.

An end user 2-1 is an L2-VPN user. The flow of a packet forwarded from the end user 2-1 to an L2-VPN network 1-8 is indicated by a dotted line. The end user 2-1 forwards a packet to a packet forwarding apparatus 4 via a customer edge switch 2-11 and a local-carrier ATM access network 3-1.

The packet forwarding apparatus 4 is connected to the local-carrier ATM access network 3-1 via a physical line 3-11.

The physical line 3-11 transmits signals in the form of synchronous frames of the STM-1 (Synchronous Transport Module, level 1) type. An STM-1 line in the physical line 3-11 includes a virtual line supporting VPN services to the end user.

A first permanent virtual circuit (PVC) 3-12 is a virtual channel for handling an L2-VPN of the end user 2-1.

An ATM packet from the ATM access network 3-1 is forwarded to an ATM interface 41a in the packet forwarding apparatus 4 via the physical line 3-11.

The packet from the end user 2-1 is forwarded to an ATM-Ether packet converter 42, the ATM-Ether packet converter 42 converting the ATM packet into an Ether packet (also referred to as an "Ether frame") having a MAC address.

The ATM packet is converted into an Ether packet, the Ether packet having a tag, the tag having a VLAN number associated with the end user 2-1.

The Ether packet from the end user 2-1 is bridged by an L2-SW 43 according to the MAC address. Since the end user 2-1 is an L2-VPN user, the packet from the end user 2-1 is forwarded by the L2-SW 43 to an edge switch 1-6 located on the L2-VPN network 1-8 via an Ether interface 44 and an Ether physical line.

When a packet is forwarded from the edge switch 1-6 to the end user 2-1, the packet is forwarded by a reverse procedure to that for forwarding a packet from the end user 2-1 to the edge switch 1-6.

An end user 2-2 is an IP-VPN user. The flow of a packet forwarded from the end user 2-2 is indicated by a solid line. An IP packet from the end user 2-2 is forwarded to the packet forwarding apparatus 4 via a customer edge switch 2-12 and the local-carrier ATM access network 3-1.

A second PVC 3-13 is a virtual channel for implementing a first virtual wide area network (VWAN #1) of the end user 2-2.

The ATM interface 41a in the packet forwarding apparatus 4 accesses the physical line 3-11 to transmit or receive an ATM packet to or from the ATM access network 3-1.

Since the end user 2-2 is an IP-VPN user, the packet from the end user 2-2 is forwarded to the ATM interface 41a, and is then converted into an IP packet by an ATM-IP packet converter 45a.

The IP packet from the ATM-IP packet converter 45a is assigned a MAC address by an IP-Ether packet converter 46a so as to perform point-to-point (P-P) connection at the subsequent L2-SW 43 before it is forwarded to the L2-SW 43.

The L2-SW 43 forwards the Ether packet from the IP-Ether packet converter 46a to an IP-Ether packet converter 47 according to the MAC address.

The IP-Ether packet converter 47 converts the Ether packet into an IP packet, and forwards the IP packet to an ATM-IP packet converter 48.

The ATM-IP packet converter 48 converts the IP packet into an ATM packet, and forwards the ATM packet to an ATM interface 49.

The ATM packet from the ATM interface 49 is forwarded to the IP-VPN network 1-7 via a physical line 1-51 of the STM-1 type and an edge router 1-5.

The edge router 1-5 accommodates IP-VPN users by an ATM line.

The physical line 1-51 includes a first PVC 1-52 and a second PVC 1-53. The first PVC 1-52 is a virtual channel for implementing a first virtual wide area network (VWAN #1) of the end user 2-2. The second PVC 1-53 is a virtual channel for implementing a first virtual wide area network (VWAN #2) of an end user 2-3.

When a packet is forwarded from the edge router 1-5 to the end user 2-2, the packet is forwarded by a reverse procedure to that for forwarding a packet from the end user 2-2 to the edge router 1-5.

The end user 2-3 is an IP-VPN user. Thus, a packet from the end user 2-3 is forwarded to an ATM interface 41b, after which this ATM packet is converted into an IP packet by an ATM-IP packet converter 45b.

The ATM interface 41b is provided with a physical line 3-14. The physical 3-14 includes a PVC 3-15 for the end user 2-3.

The IP packet from the ATM-IP packet converter 45b is assigned a MAC address by an IP-Ether packet converter 46b so as to perform P-P connection at the subsequent L2-SW 43 before it is forwarded to the L2-SW 43.

The L2-SW 43 inputs the Ether packet from the IP-Ether packet converter 46b to the IP-Ether packet converter 47 according to the MAC address.

The IP-Ether packet converter 47 converts the Ether packet into an IP packet, and inputs the IP packet to the ATM-IP packet converter 48.

The ATM-IP packet converter 48 converts the IP packet into an ATM packet, and inputs the ATM packet to the ATM interface 49.

The ATM packet from the ATM interface 49 is forwarded to the IP-VPN network 1-7 via the physical line 1-51 of the STM-1 type and the edge router 1-5.

When a packet is forwarded from the edge router 1-5 to the end user 2-3, the packet is forwarded by a reverse procedure to that for forwarding a packet from the end user 2-3 to the edge router 1-5.

The L2-SW 43 forwards a packet according to a MAC address based on a physical line (port) to be connected to the packet forwarding apparatus 4 and virtual line information (i.e., a VLAN number) contained in the physical line.

Specifically, the following definitions are provided:

The physical line 3-11 is allocated MAC address A.
The PVC 3-12 in the physical line 3-11 is a virtual channel for the L2-VPN user 2-1.
The PVC 3-13 in the physical line 3-11 is a virtual channel for the IP-VPN user 2-2.
This virtual channel is assigned VLAN number 1.
The physical line 3-14 is allocated MAC address B.
The PVC 3-15 in the physical line 3-14 is a virtual channel for the IP-VPN user 2-3.
This virtual channel is assigned VlAN number 2.
The physical line 1-51 is allocated MAC address C.

The PVC 1-52 in the physical line 1-51 is a virtual channel for the IP-VPN user 2-2. This virtual channel is assigned VLAN number 1.

The PVC 1-53 in the physical line 1-51 is a virtual channel for the IP-VPN user 2-3.

This virtual channel has VLAN number 2. Thus The L2-SW 43 performs switching so as to forward a packet to any port (PVC) having the same VLAN number as that of the input port, other than an input port.

There are packet changing means to compile the ATM-Ether packet converter 42, the ATM-IP packet converter 45a, 45b and 48, the IP-Ether packet converter 46a, 46b and 47. The packet changing means change a packet format from preliminary step into other packet format.

Figure 4:
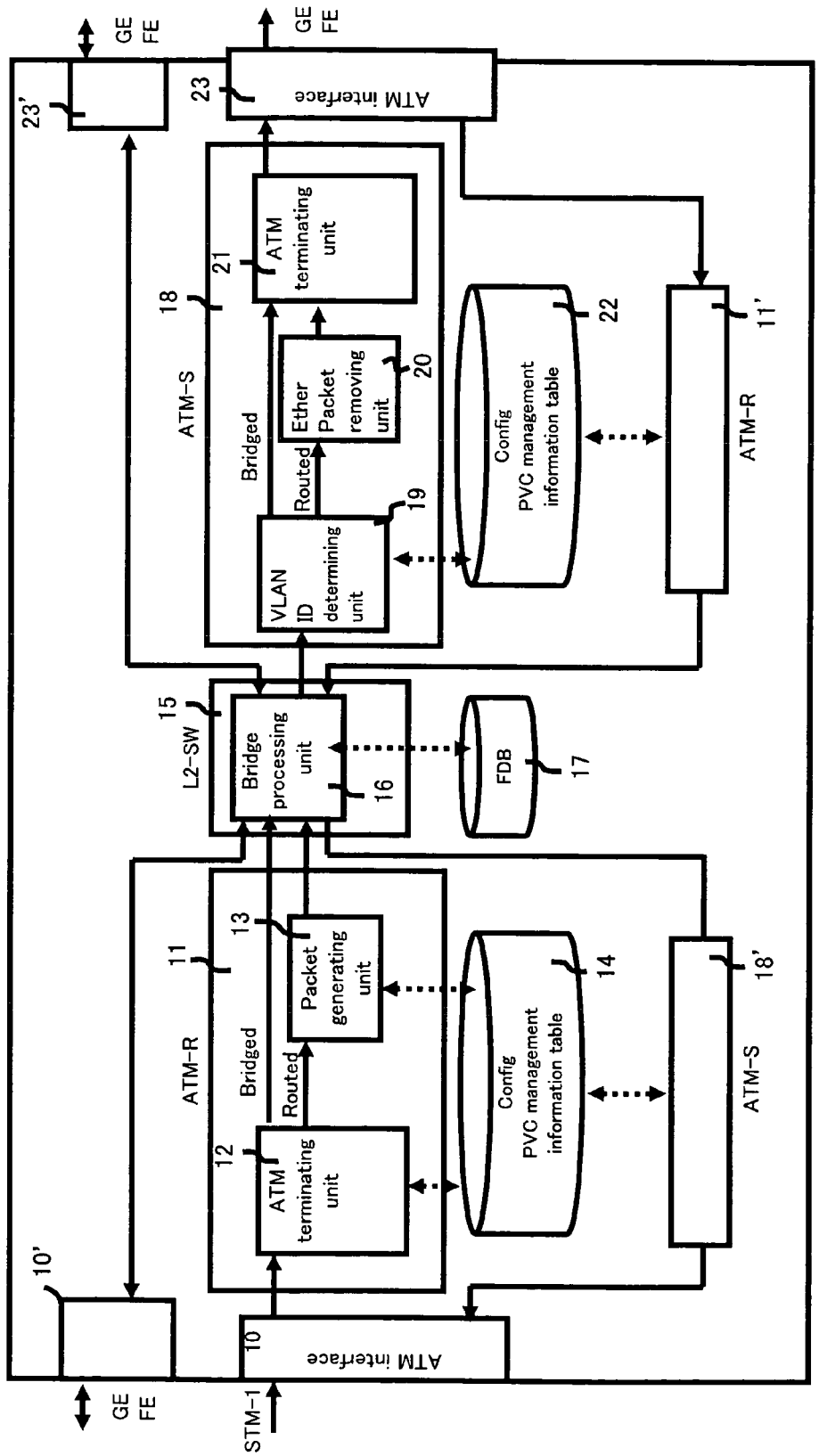
FIG. 4 is a block diagram of a packet forwarding apparatus according to the first embodiment.

FIG. 4 shows an internal structure of the packet forwarding apparatus 4. An ATM packet input to an ATM interface 10 is forwarded to an ATM receiving unit 11.

In the ATM receiving unit 11, an ATM terminating unit 12 obtains a PVC number associated with an ATM cell received via an STM-1 physical line 3-11 from a PVC management information table 14, and determines whether the packet of the accommodated user is a bridged or routed packet.

In a case of a bridged packet, the ATM terminating unit 12 terminates the received ATM packet, and reconfigures an Ether packet.

In a case of a routed packet, the ATM terminating unit 12 terminates the received ATM packet, and reconfigures an IP packet.

When the packet from the ATM terminating unit 12 is a routed packet, an Ether packet generating unit 13 encapsulates the packet with the MAC address set in the PVC management information table 14.

In an L2-SW 15, a bridge processing unit 16 learns a MAC address, a VLAN number, and a port number of a connected port, and stores the learned data in a forwarding database (FDB) 17. The bridge processing unit 16 performs bridging based on the FDB 17.

In an ATM transmitting unit 18, a VLAN ID determining unit 19 determines whether the connection of the accommodated user is a bridged or routed connection from the VLAN number by referring to a PVC management information table 22.

When the VLAN ID determining unit 19 determines that the connection of the accommodated user is a routed connection, an Ether packet removing unit 20 decapsulates the MAC address from the Ether packet to generate an IP packet.

An ATM terminating unit 21 converts the packet to be input to an ATM interface unit 23 into an ATM packet.

The ATM interface unit 23 forwards the ATM packet to a physical line port connected thereto.

A packet forwarded from the port connected to the ATM interface unit 23 is performed to the same processing as that of the ATM receiving unit 11 by an ATM receiving unit 11'.

The packet is input to the bridge processing unit 16 in the L2-SW 15, and is forwarded based on the FDB learned information.

An ATM transmitting unit 18' performs the same processing as that of the ATM transmitting unit 18 on the packet forwarded from the L2-SW 15, and forwards the resulting packet to the ATM interface unit 10.

The ATM interface unit 10 forwards the ATM packet from the ATM transmitting unit 18' to a physical line port connected to the ATM interface unit 10.

Ether interfaces 10' and 23' transmit and receive packets from physical line ports connected to the Ether interfaces 10' and 23' and the L2-SW 15.

The ATM interface 10 and 23, Ether interfaces 10' and 23' have input-output ports, the input-output ports including at least one input port or out put port.

Since the packets input to the Ether interfaces 10' and 23' are Ether packets, the L2-SW 15 can directly learn the MAC addresses, and can switch the Ether packet based on the learned information stored in the FDB 17.

FIG. 5 is PCV management information table 14 and 22 of FIG. 4. The ATM terminating unit 12, the Ether packet generating unit 13 and the VLAN ID determining unit 19 refer to the PVC management information tables 14 and 22 in FIG. 5 for processing shown in FIG. 4.

The PVC management information stored in the PVC management information tables 14 and 22 is configured by an administrator depending on the VPN type of the user.

Specifically, the PVC management information includes the virtual path (VP) number and the virtual channel (VC) number that are specified in the STM format accommodated in the physical line, the type of the accommodated user using this PVC, the number of the virtual local area network (VLAN), the MAC address of the source port, and the MAC address of the destination port.

The type of the accommodated user is set to either "routed" for an IP-VPN user or "bridged" for an L2-VPN user on a PVC-by-PVC basis.

The MAC addresses are confined to use within the packet forwarding apparatus 4 when the IP-VPN user is accommodated (i.e., a routed connection).

The VLAN-ID is an ID indicating the relationship between port numbers and PVCs of both connected nodes. The same VLAN-ID is allocated to both connected PVCs to determine the forwarding node. In FIG. 5, when IP-VPN users are accommodated, the IP-VPN users are limited to P-P connection so that the MAC address of the destination port can be determined.

Figure 6:
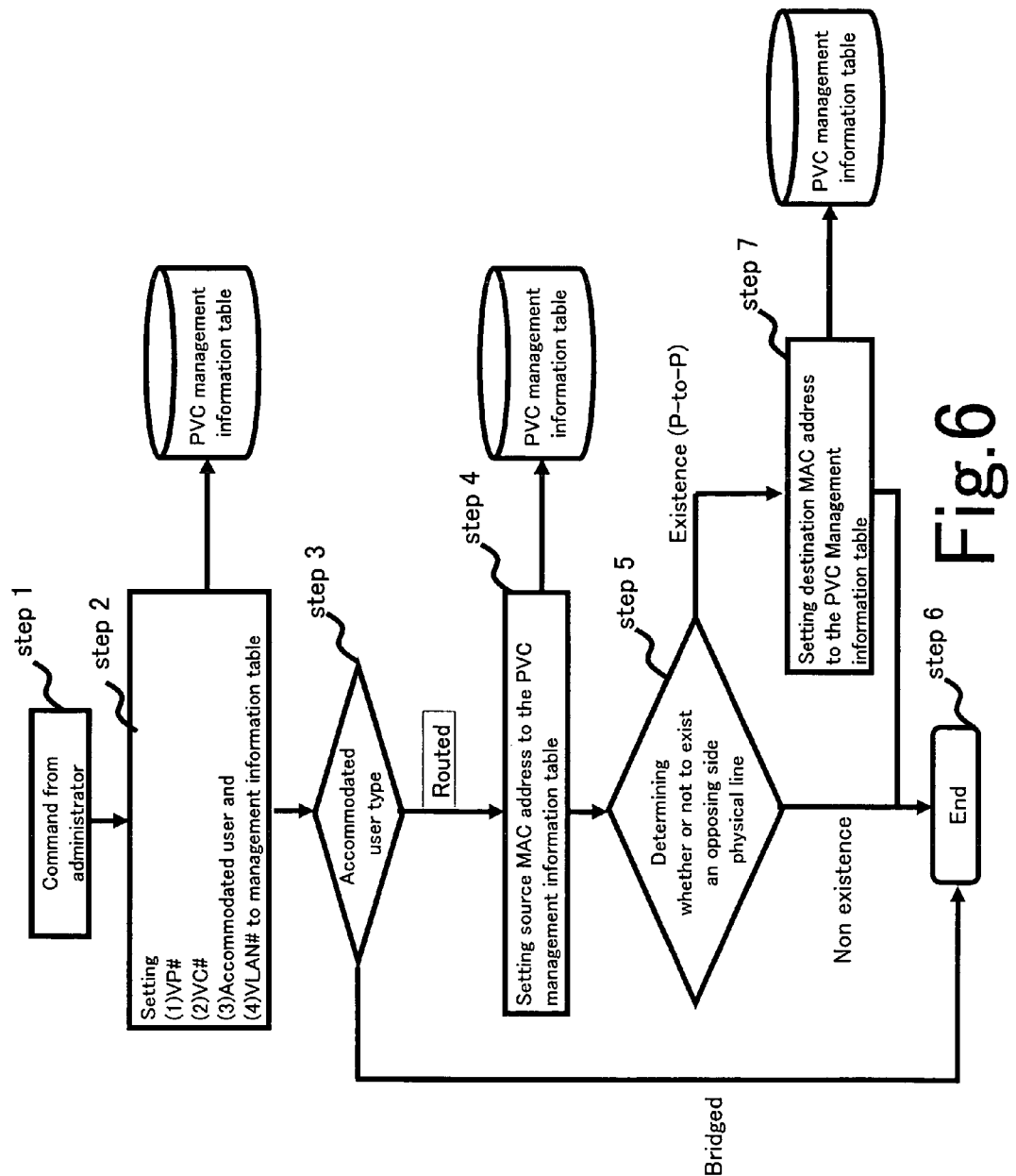
FIG. 6 is a flowchart showing a process for creating a PVC management information table according to the first embodiment.

FIG. 6 is a flowchart showing a process for creating a PVC management information table.

In step 1, an administrator inputs a table creation command to a PVC management information table.

In step 2, the VP number, the VC number, the VPN type of the accommodated user, and the VLAN number are written to the PVC management information table. The VLAN number is a number for identifying the VLAN to which the packet belongs.

In step 3, it is determined whether the connection of the accommodated user is a routed or bridged connection. In a case of a bridged connection, the process ends.

In step 4, the MAC address, which is a source port address assigned to input and output units of a bridge processing unit in a packet forwarding apparatus, is written to the PVC management information table.

In step 5, it is determined whether or not an opposing physical line exists with respect to the source port (that is, whether or not there is a point-to-point connection). In ATM transmission, it is determined whether or not a PVC-based virtual channel in an opposing physical line exists with respect to the source port. In second and third embodiments of the present invention discussed below, since it is assumed that an IP-VPN network is not an ATM network, the physical line status is checked.

If it is determined in step 5 that no opposing physical line exists with respect to the source port, then, in step 6, the process ends.

If an opposing physical line exists with respect to the source port, that is, there is a point-to-point connection, then, in step 7, the destination MAC address assigned in the apparatus from the port of the opposing physical line is set in the PVC management information table.

Figure 7:
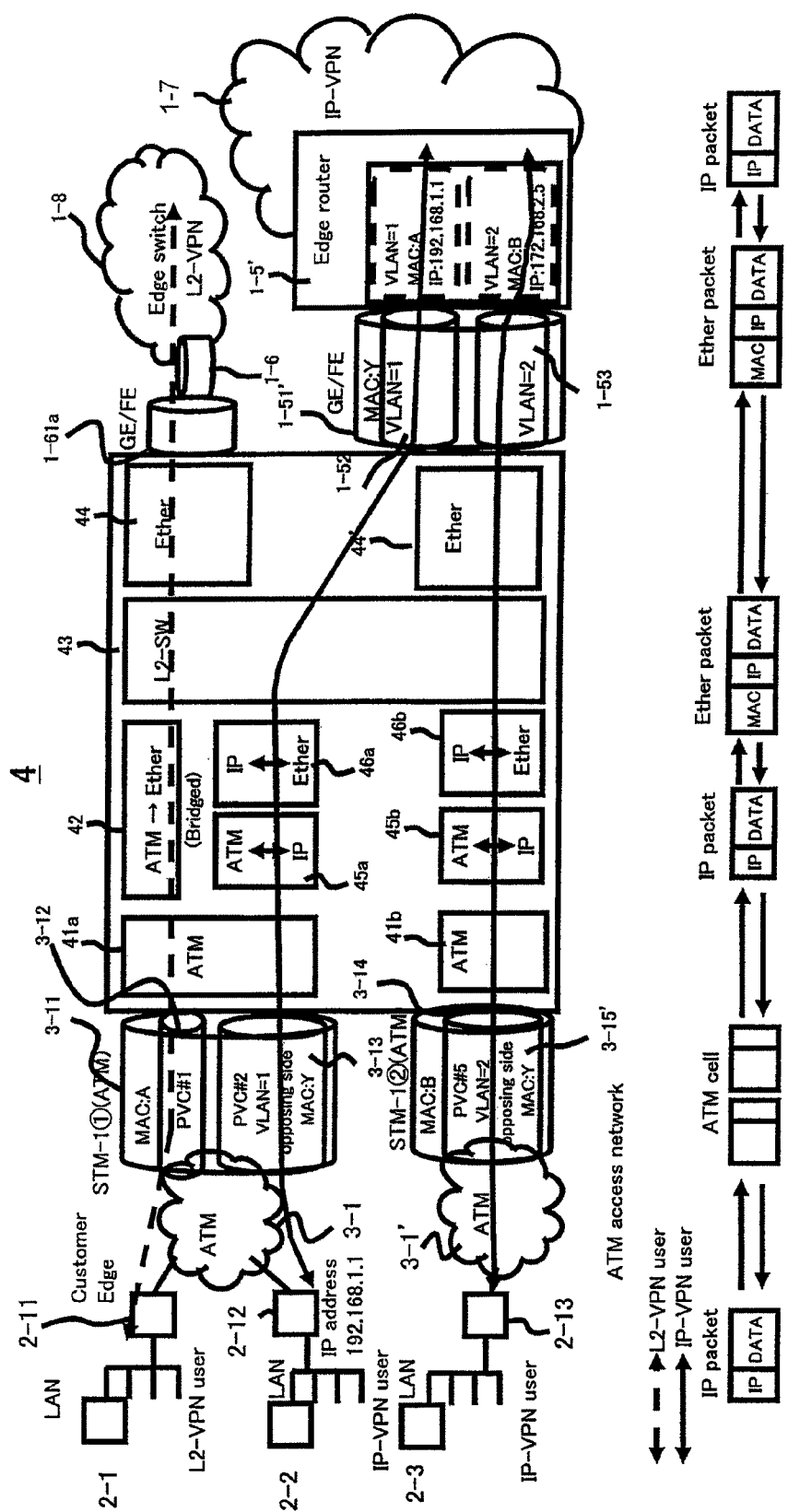
FIG. 7 is a diagram showing the flow of packets according to a second embodiment of the present invention.

FIG. 7 shows the flow of packets forwarded in a packet forwarding apparatus according to a second embodiment of the present invention. In FIG. 7, the same components as those shown in FIG. 3 are represented by the same reference numerals, and a description thereof is omitted.

In FIG. 7, packets from end users are forwarded in the form of Ether packets to the IP-VPN network 1-7. That is, the arrangement shown in FIG. 7 is different from that shown in FIG. 3 in that, when an IP-VPN packet is forwarded to the IP-VPN network 1-7, an Ether packet, rather than an ATM packet, is directly forwarded to the edge router 1-5 via an Ether interface 44'.

This packet forwarding mechanism is implemented by statically configuring MAC addresses of the edge router 1-5 and the packet forwarding apparatus 4 and generating an Ether packet.

In the packet forwarding apparatus 4, a physical line 1-51' connected to the Ether interface 44' is an Ether line, and is assigned MAC address Y that is different from that of the physical line 1-51 shown in FIG. 3. The physical line 1-51' includes two VLANs with VLAN number 1 and VLAN number 2 according to the VLAN configurations of the respective end users 2-2 and 2-3.

Figure 8:
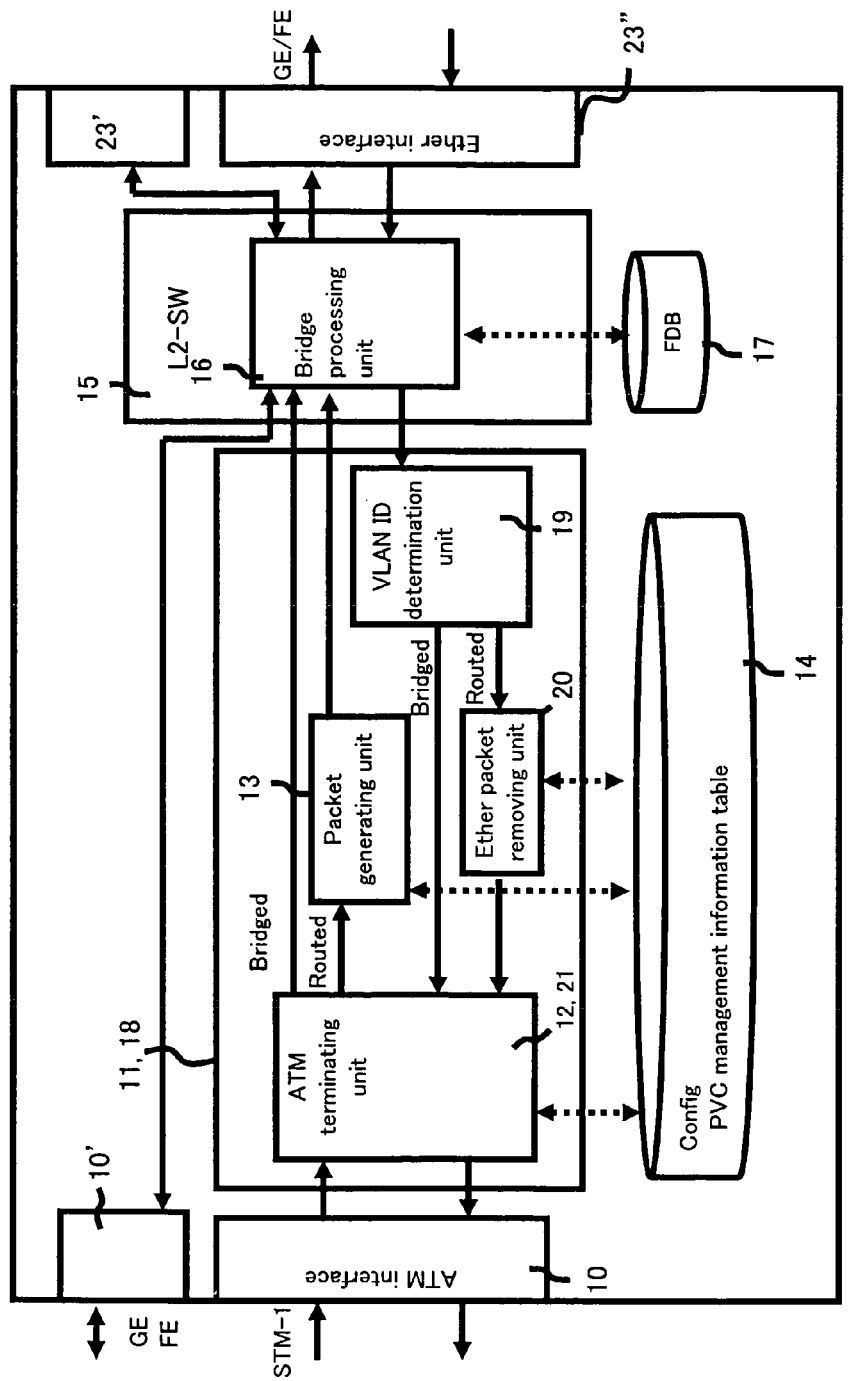
FIG. 8 is a block diagram of a packet forwarding apparatus according to the second embodiment.

Specifically, a PVC management information table 14 shown in FIG. 8 includes PVC management information shown in FIG. 9, and destination MAC addresses in the PVC management information are set by commands from an administrator.

Figure 10:
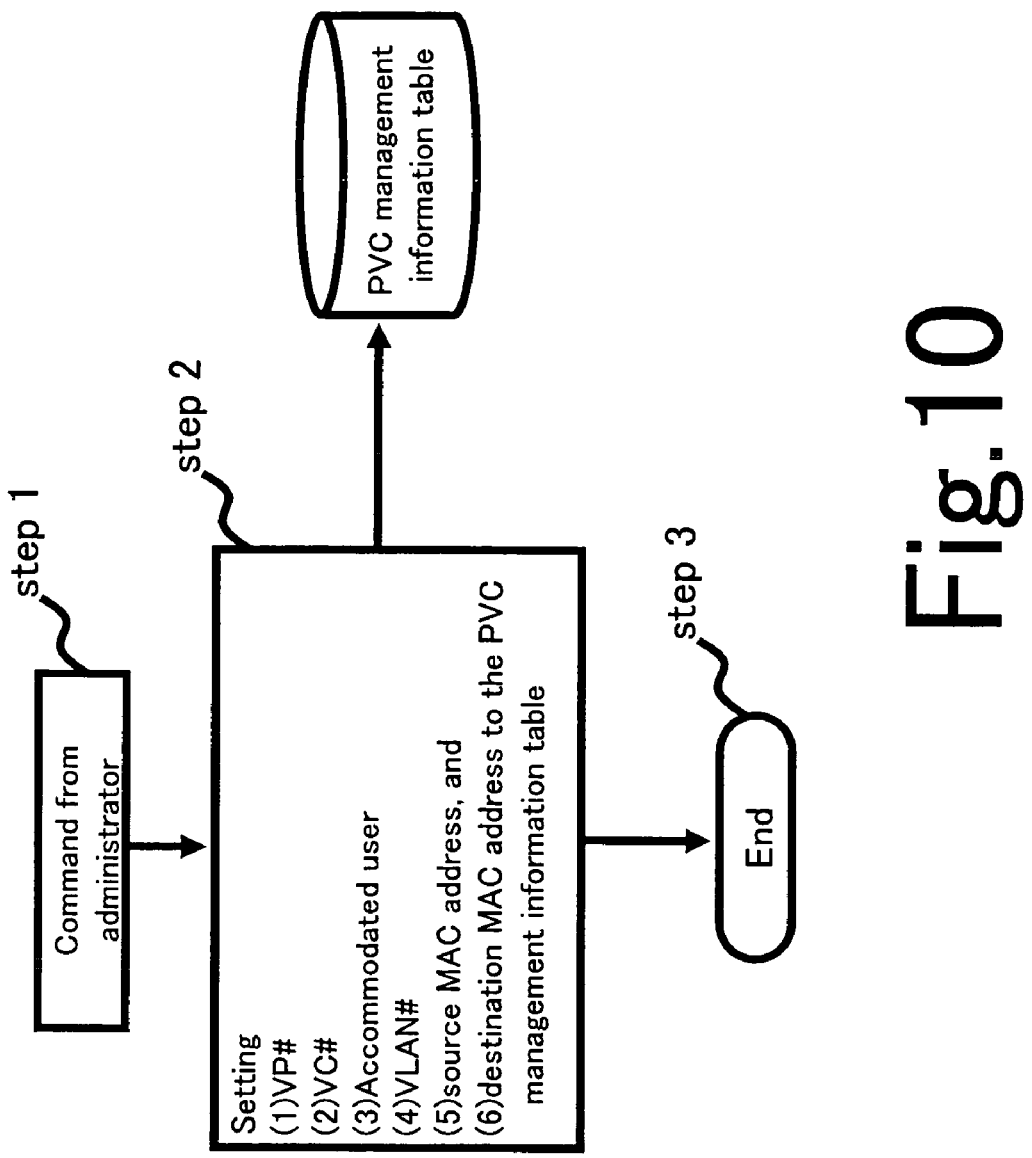
FIG. 10 is a flowchart showing a process for creating a PVC management information table according to the second embodiment.

The PVC management information table 14 including the PVC management information shown in FIG. 9 is thus created by a simple procedure shown in FIG. 10. Specifically, the following steps 1 to 3 of FIG. 10 are performed to create a PVC management information table.

In step 1, an administrator inputs a table creation command to a PVC management information table.

In step 2, if the connection of the accommodated user is a routed connection, the VP number, the VC number, the VPN type of the accommodated user, the VLAN number, the source MAC address, and the destination MAC address are written to the PVC management information table. If the connection of the accommodated user is a bridged connection, the VP number, the VC number, the VPN type of the accommodated user, and the VLAN number are written to the PVC management information table.

In step 3, the procedure ends.

However, the edge router 1-5 shown in FIG. 7 needs to statically configure the opposing physical-line MAC addresses (A and B) assigned to the physical lines 3-11 and 3-14 of the packet forwarding apparatus 4, the VLAN numbers (VLAN #1 and VLAN #2) of the PVCs 3-13 and 3-15', and the IP addresses of the IP-VPN users 2-2 and 2-3.

In FIG. 7, the IP-VPN user 2-2 has IP address 192.168.1.1, and the IP-VPN user 2-3 has IP address 172.168.25.1.

Thus, IP addresses 192.168.1.1 and 172.168.25.1 are set in the edge router 1-5.

FIG. 8 shows an example structure of the packet forwarding apparatus according to the second embodiment. In FIG. 8, for simplification of illustration, an ATM receiving unit 11 and an ATM transmitting unit 18 are collectively illustrated in one block. In FIG. 8, the same blocks as those shown in FIG. 4 are represented by the same reference numerals, and a description thereof is omitted.

An Ether interface 23" receives a packet directly from the L2-SW 15, and directly inputs a packet from a physical line to the L2-SW 15, which is different from the structure shown in FIG. 4.

Figure 11:
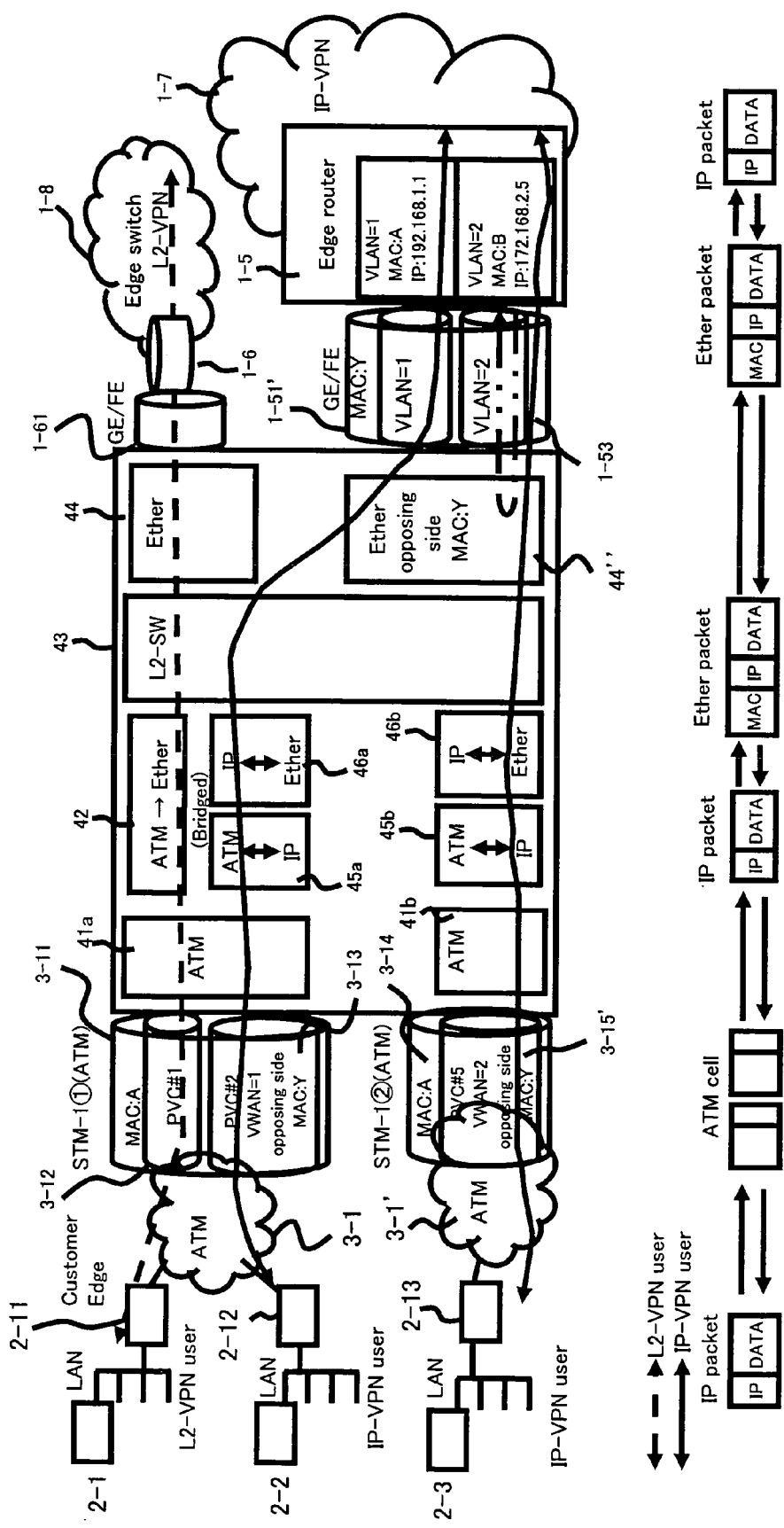
FIG. 11 is a diagram showing the flow of packets according to a third embodiment of the present invention.

FIG. 11 shows the flow of packets forwarded in a packet forwarding apparatus according to a third embodiment of the present invention. In FIG. 11, the same components as those shown in FIG. 3 are represented by the same reference numerals, and a description thereof is omitted.

In FIG. 11, packets from end users are forwarded in the form of Ether packets to the IP-VPN network 1-7. An Ether interface 44" implements an address resolution protocol (ARP) to return a MAC address commonly assigned to physical lines in response to an ARP packet from the edge router 1-5 so that a MAC address can commonly be assigned on an apparatus-by-apparatus basis.

Specifically, the port settings for physical lines are as follows:

The physical line 3-11 is allocated MAC address A.

The PVC 3-12 in the physical line 3-11 is a virtual channel for the L2-VPN user 2-1.

The PVC 3-13 in the physical line 3-11 is a virtual channel for the IP-VPN user 2-2. The PVC 3-13 is assigned opposing MAC address Y and VLAN number 1.

The physical line 3-14 is allocated MAC address A.

The PVC 3-15 in the physical line 3-14 is a virtual channel for the IP-VPN user 2-3.

This virtual channel is assigned opposing MAC address Y and VLAN number 2.

The physical line 1-51' is allocated MAC address Y at the edge router 1-5.

The physical line 1-51' is assigned VLAN number 1 (for the PVC 1-52) and VLAN number 2 (for the PVC 1-53).

The operation of the L2-SW 43 is similar to that in the first and second embodiments.

The edge router 1-5 shown in FIG. 11 needs to statically configure the VLAN numbers (VLAN #1 and VLAN #2).

Figure 12:
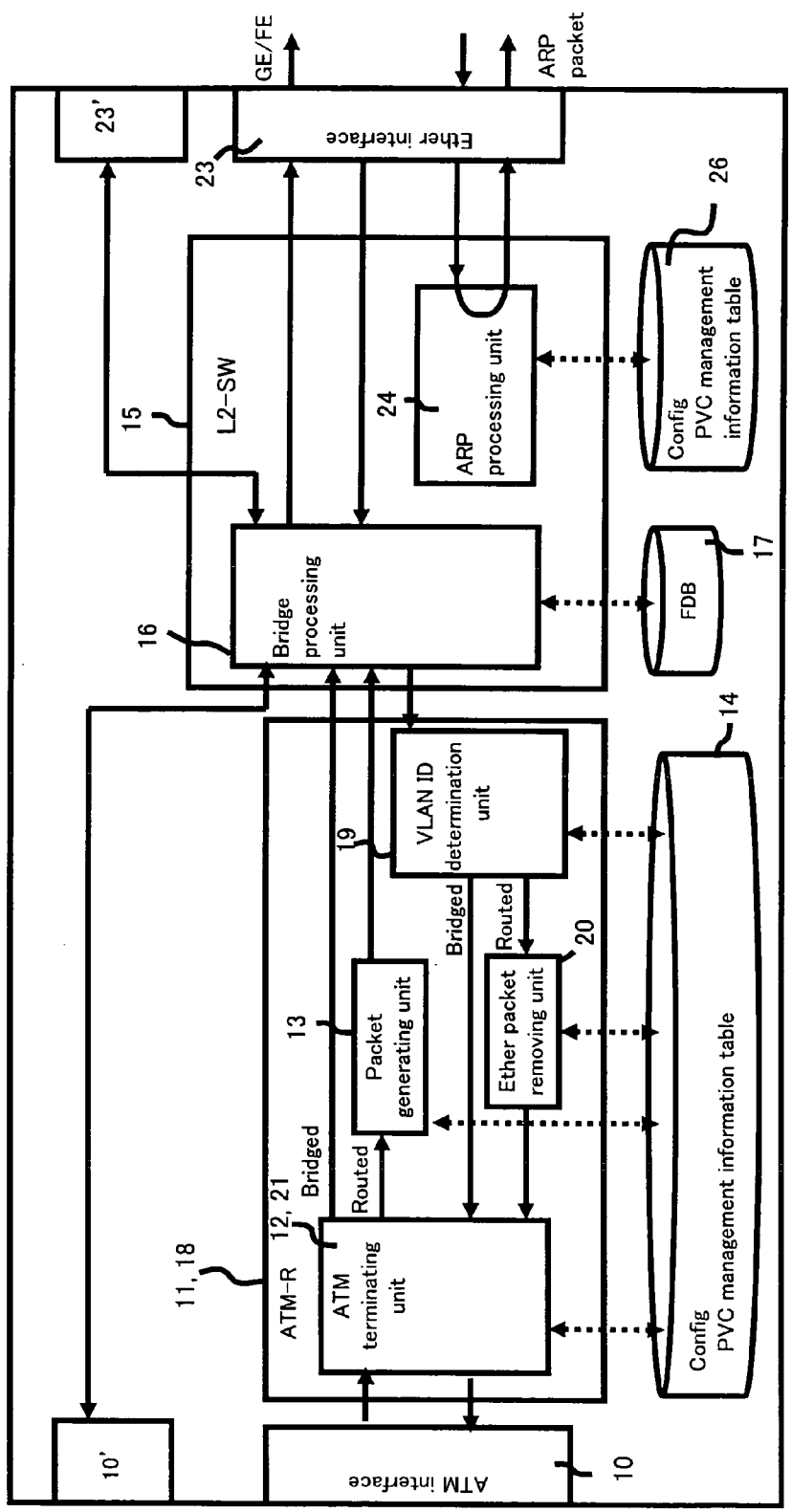
FIG. 12 is a block diagram of a packet forwarding apparatus according to the third embodiment.

FIG. 12 shows a structure of the packet forwarding apparatus according to the third embodiment. In FIG. 12, the same components as those shown in FIGS. 4 and 8 are represented by the same reference numerals, and a description thereof is omitted.

In FIG. 12, the L2-SW 15 further includes an ARP processor 24.

The ARP processor 24 refers to a PVC management information table 26 in response to an ARP packet from an opposing node, and returns MAC address A assigned to the ARP processor 24.

In this case, the ARP processor 24, without conditions, returns MAC address A, which is assigned on an apparatus-by-apparatus basis, in response to the ARP packet without referring to IP addresses. This arrangement is realized by uniformly setting MAC addresses of all source ports to A on an apparatus-by-apparatus basis without the need to implement a complete ARP protocol.

A standard ARP protocol for returning the corresponding MAC address from the IP address may be implemented to assign the MAC address of the source port in units of physical ports.

FIG. 13 shows the PVC management information tables 14 and 26. An administrator sets PVC information including VP and VC numbers, accommodated-user information, a VLAN number, a source MAC address, and a destination MAC address.

The PVC management information tables 14 and 26 are also created by the procedure shown in FIG. 10.

Figure 14:
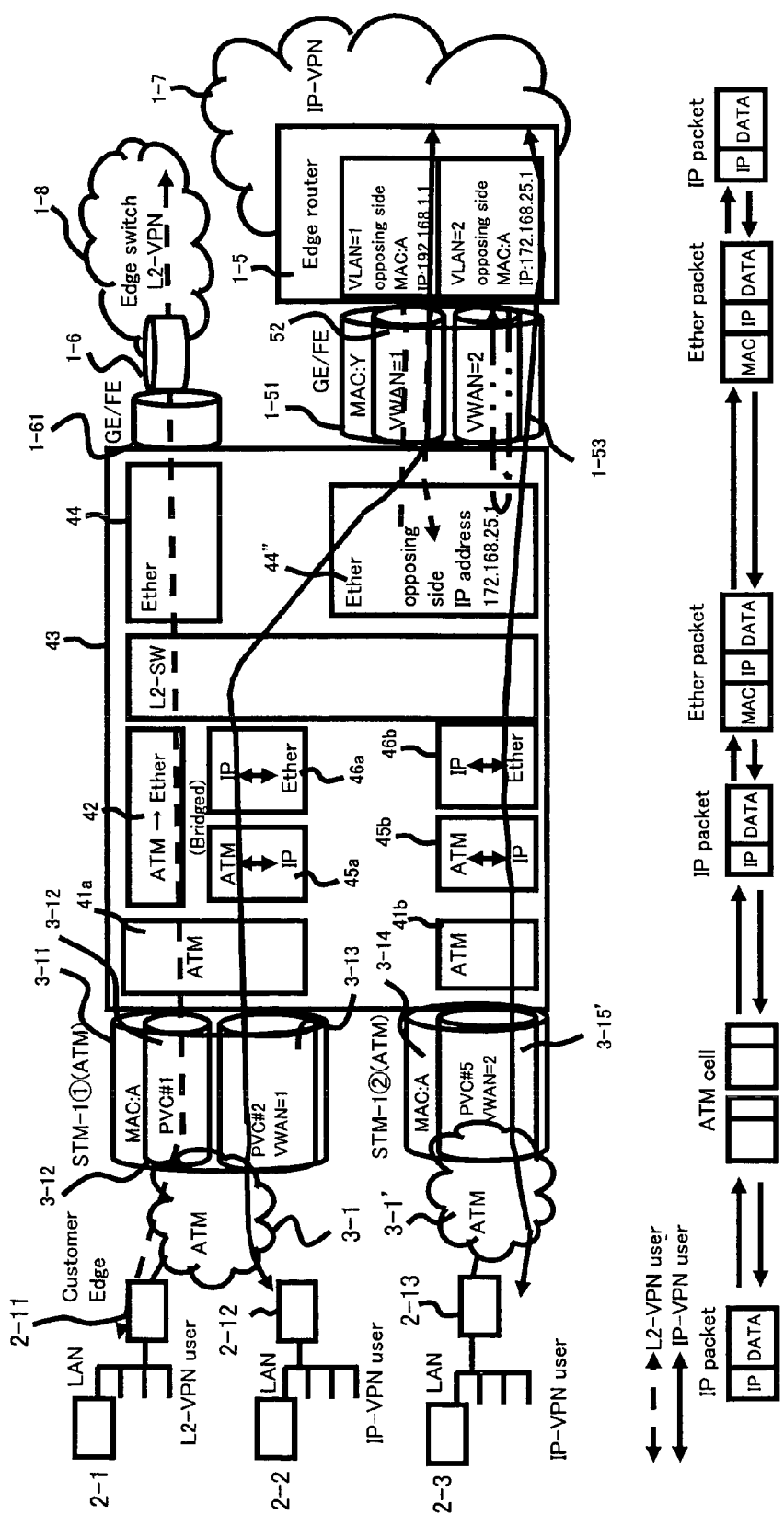
FIG. 14 is a diagram showing the flow of packets according to a fourth embodiment of the present invention.

FIG. 14 shows the flow of packets forwarded in a packet forwarding apparatus according to a fourth embodiment of the present invention. In FIG. 14, the same components as those shown in FIG. 3 are represented by the same reference numerals, and a description thereof is omitted.

In FIG. 14, packets from end users are forwarded in the form of Ether packets to the IP-VPN network 1-7. An Ether interface 44" implements an ARP so as to return a MAC address commonly assigned to physical lines in response to an ARP packet from the edge router 1-5. Furthermore, the Ether interface 44" obtains an opposing MAC address from the opposing edge router 1-5.

In order to obtain an opposing MAC address from the edge router 1-5, the Ether interface 44" configures the IP address of the opposing edge router 1-5 in units of physical ports, and transmits an ARP request. The Ether interface 44" receives an ARP response from the edge router 1-5, thereby automatically obtaining the destination MAC address.

Figure 15:
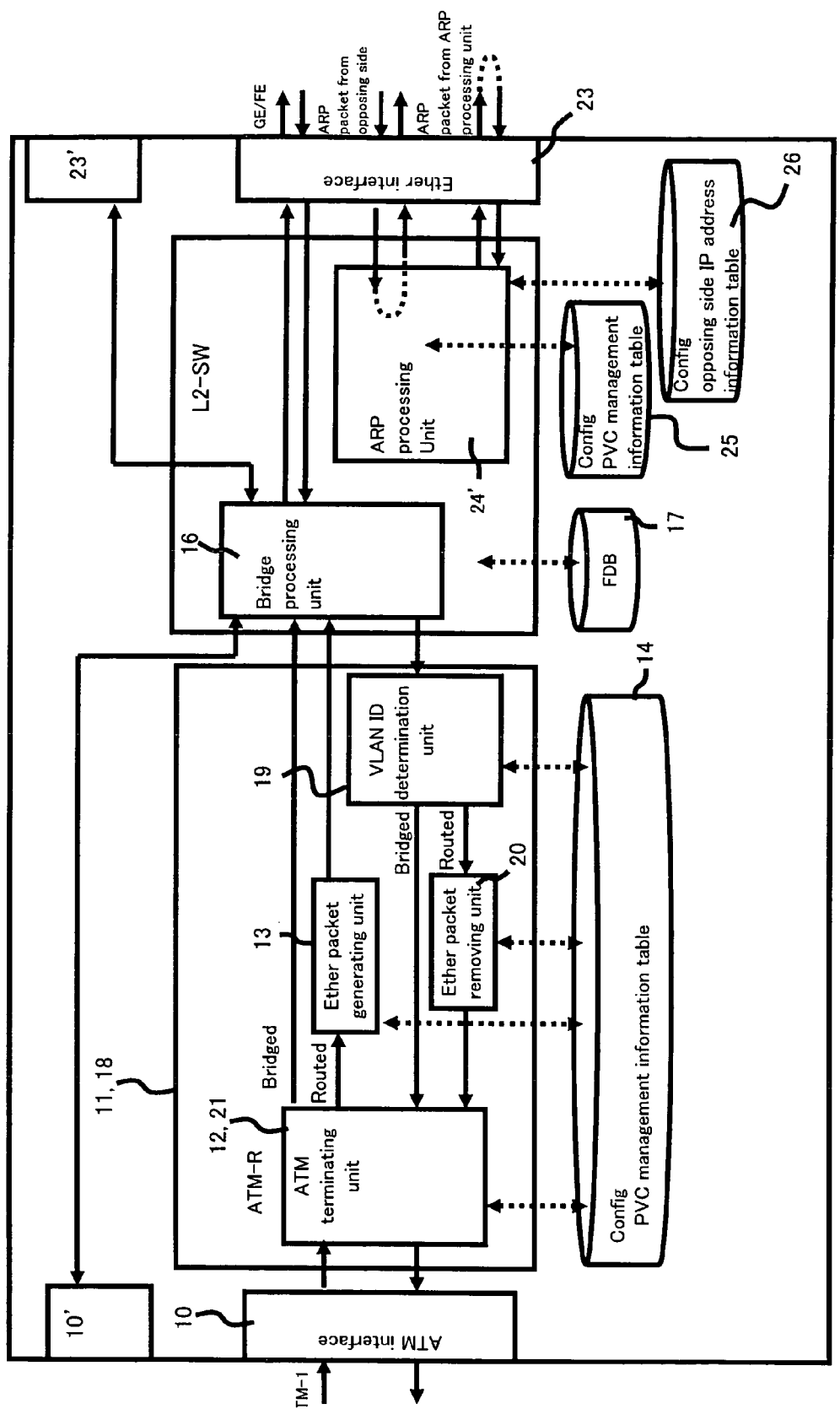
FIG. 15 is a block diagram of a packet forwarding apparatus according to the fourth embodiment.

FIG. 15 shows a structure of the packet forwarding apparatus according to the fourth embodiment. In FIG. 15, the same components as those shown in FIGS. 4 and 8 are represented by the same reference numerals, and a description thereof is omitted. In FIG. 15, the L2-SW 15 further includes an ARP processor 24'.

Along with the addition of the ARP processor 24', there is further provided an opposing IP address information table 26 that manages opposing IP address information in units of physical ports.

The difference between the ARP processor 24' and the ARP processor 24 shown in FIG. 12 is that the ARP processor 24' has additional functions for sending an ARP packet to the opposing edge router 1-5 and receiving a MAC address in units of physical ports.

The ARP processor 24' refers to a PVC management information table 25 in response to an ARP packet from the opposing edge router 1-5, and returns the MAC address assigned for each packet forwarding apparatus 4.

The ARP processor 24' refers to the opposing IP address information table 26, and transmits an ARP packet to the opposing edge router 1-5 to obtain the MAC address information of the opposing node.

When a plurality of ATM ports are used, the same MAC address is assigned for each port of the packet forwarding apparatus 4, and the MAC address assigned on an apparatus-by-apparatus basis can be returned without conditions in response to an ARP request from the edge router 1-5 without referring to the IP address.

Thus, the operation is realized without implementing a complete ARP protocol. A standard ARP protocol for returning the corresponding MAC address from the IP address may be implemented to assign the MAC address of the source port in units of physical ports.

The operation of the ARP processor 24' will now be described. The ARP processor 24' transmits an ARP query to the IP address assigned to the edge router 1-5, and obtains the MAC address of the opposing node.

The ARP processor 24' uses the obtained MAC address and the MAC address assigned to the ATM port to generate an Ether packet.

It is assumed that the source MAC address is a MAC address allocated to the apparatus and the destination MAC address is a MAC address obtained in response to the ARP query from the opposing Ether port.

In FIG. 15, the accommodated IP-VPN users are limited to p-p connections, and the same VWAN number is assigned to the connected ports and PVCs.

However, the same VLAN number is assigned to up to two ports in order to determine the MAC address of the opposing node.

In FIG. 15, furthermore, the Ethernet port connected to the edge router 1-5 is assigned the IP address of the edge router 1-5.

FIG. 16 shows PVC management information tables 14 and 25 and opposing side IP address information of the opposing side IP address information table.

An administrator sets PVC information including VP and VC numbers, accommodated-user information, a VLAN number, a source MAC address, and a destination MAC address.

Figure 17:
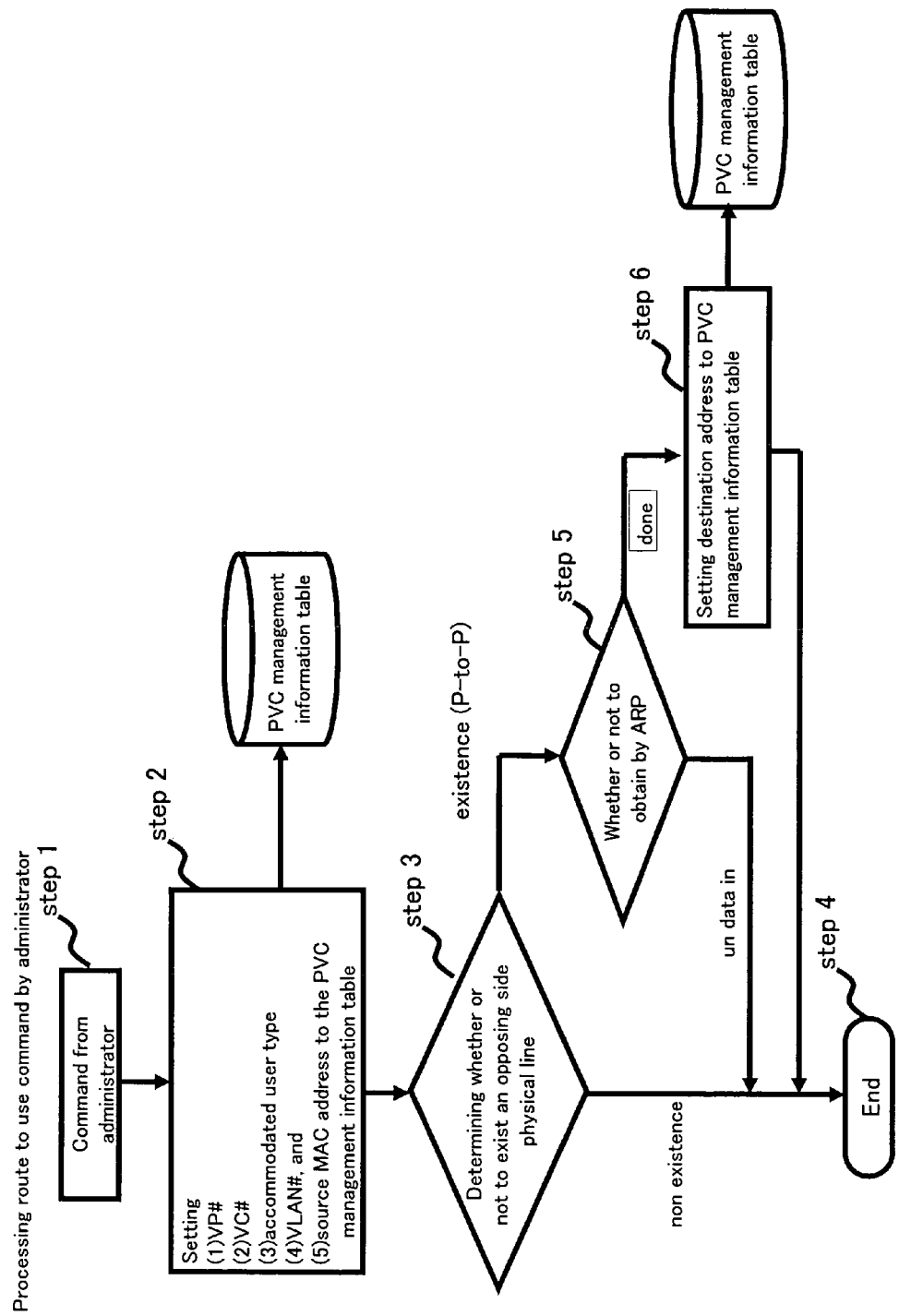
FIG. 17 is a flowchart showing a process for creating a PVC management information table according to the fourth embodiment.

These PVC management information tables are created by a procedure shown in FIG. 17.

FIG. 17 is a flowchart showing a process for creating a PVC management information table.

In step 1, an administrator inputs a table creation command to a PVC management information table.

In step 2, the VP number, the VC number, the VPN type of the accommodated user, the VLAN number, and the source MAC address are written to the PVC management information table.

In step 3, it is determined whether or not an opposing node exists (that is, whether or not there is a point-to-point connection).

If no opposing node exists, then, in step 4, the process ends.

If an opposing node exists, that is, there is a point-to-point connection, then, in step 5, it is determined whether or not a destination MAC address has been obtained according to the ARP protocol.

If the destination MAC address has been obtained, then, in step 6, the destination MAC address is written to the PVC management information table.

FIG. 18 is a flowchart showing ARP-based processing.

In step 1, opposing IP address information with respect to a packet forwarding apparatus is obtained, and an ARP request is transmitted to the opposing device.

In step 2, an ARP response is received from the opposing device.

In step 3, it is determined whether or not an opposing node exists.

If an opposing node exists, then, in step 4, the destination MAC address is set in the PVC management information table.

According to an embodiment of the present invention, a packet forwarding apparatus that uses a switch that performs MAC-address-based switching to switch between an L2-VPN packet and an IP-VPN packet can be achieved.

A packet forwarding apparatus of the related art needs to include a plurality of layer-3 protocols to process an IP-VPN packet because of the need to perform layer-3 processing. On the other hand, a packet forwarding apparatus according to an embodiment of the present invention implements no layer-3 protocols to forward a packet.

Further, according to an embodiment of the present invention, the implementation of an ARP (address resolution protocol) that is used to resolve the MAC addresses of packet forwarding apparatuses or the use of the MAC addresses that are confined to the individual apparatuses allows a system that uses a switch that performs MAC-address-based switching to automatically assign MAC addresses to input and output units of a packet forwarding apparatus.

What is claimed is:

1. A packet forwarding apparatus for forwarding a packet, the packet forwarding apparatus being capable of being coupled to a plurality of physical lines, each coupled to a virtual private network (VPN) for forwarding layer 2 (L2) packets or internet protocol (IP) packets, the packet forwarding apparatus comprising:
- a plurality of input interfaces each coupled to at least one physical line;
- a plurality of output interfaces each coupled to at least one physical line;
- a L2-switch for performing L2-switching processing on packet data including a packet received from one of the plurality of input interfaces in accordance with a media access control (MAC) address and a VLAN address that are stored in the packet data;
- a permanent virtual circuit (PVC) management information table storing a user type of an accommodated user and a VLAN address for switching a packet in association with a path used by the accommodated user, the user type indicating a processing type for processing a packet received from the path and corresponding to one of a L2-VPN and an IP-VPN, the user type of routed corresponding to the IP-VPN, the user type of bridged corresponding to the L2-VPN, wherein MAC addresses used for performing switching processing on the packet data including a packet received from the path are stored in the PVC management information table in association with the path used by the accommodated user when the user type indicates routed corresponding to the IP-VPN;
- a receiver positioned between the L2-switch and the plurality of input interfaces, the receiver determining, based on the PVC management information table, a user type associated with a working path through which a packet has been received from one of the plurality of input interfaces; and
- a transmitter positioned between the L2-switch and the plurality of output interfaces, the transmitter determining, based on the PVC management information table, a user type associated with the working path, wherein
- when the receiver receives a first packet from a first input interface through a first path that is associated, in the PVC management information table, with the user type of routed corresponding to the IP-VPN,
  - the receiver determines, by referring to the PVC management information table, that the first packet is an IP packet that is received, through the first path, from the first input interface that is coupled to a physical line for the IP-VPN,
  - the receiver changes the received IP packet into a L2-encapsulated packet by adding, to an outside of the IP packet, a L2 header including MAC addresses and a VLAN address that are stored in the PVC management information table in association with the first path and the user type of routed,
  - the L2-switch performs switching processing on the L2-encapsulated packet on the basis of the MAC addresses and the VLAN address that are stored in the L2 header added to the received IP packet, and
  - the transmitter extracts the received IP packet from the L2-encapsulated packet that has been received from the L2-switch, and sends the extracted IP packet to a first output interface coupled to a physical line for the IP-VPN; and
- when the receiver receives a second packet from a second input interface through a second path that is associated, in the PVC management information table, with the user type of bridged corresponding to the L2-VPN,
  - the receiver determines, by referring to the PVC management information table, that the received second packet is a L2 packet that is received from the second input interface coupled to a physical line for the L2-VPN,
  - the receiver sends the received L2 packet to the L2-switch by setting a VLAN address that is associated with the second path in the PVC management information table, to a L2 header of the received L2 packet,
  - the L2-switch performs switching processing on the received L2 packet on the basis of MAC addresses and a VLAN address that are stored in the L2 header of the received L2 packet, and
  - the transmitter sends the received-L2 packet that has been received from the L2-switch, to a second output interface coupled to a physical line for the L2-VPN.

2. The packet forwarding apparatus according to the claim 1, wherein upon receiving a media access control address request from a system coupled to one of the plurality of physical lines, the receiver or transmitter notifies the system of a fixed media access control address.

3. The packet forwarding apparatus according to the claim 1, wherein the receiver or transmitter obtains, from a system coupled to the at least one physical line, a media access control address assigned to the system.

4. A packet forwarding apparatus for forwarding a packet, the packet forwarding apparatus being capable of being coupled to a plurality of physical lines each coupled to a virtual private network (VPN) for forwarding layer 2 (L2) packets or internet protocol (IP) packets, the packet forwarding apparatus comprising:
- a plurality of input interfaces each coupled to at least one physical line;
- a plurality of output interfaces each coupled to at least one physical line;
- a L2-switch for performing L2 switching processing on packet data including a packet received from one of the plurality of input interfaces in accordance with a media access control (MAC) address and a VLAN address that are stored in the packet data;
- a permanent virtual circuit (PVC) management information table storing a user type of an accommodated user and a VLAN address for switching a packet in association with a path used by the accommodated user, the user type of the accommodated user indicating a processing type for processing a packet received from the path and corresponding to one of a L2-VPN and an IP-VPN, the user type of routed corresponding to the IP-VPN, the user type of bridged corresponding to the L2-VPN, wherein MAC addresses used for performing L2 switching processing on the packet data including a packet received from the path are stored in the PVC management information table in association with the path used by the accommodated user when the user type indicates routed corresponding to the IP-VPN;
- a receiver positioned between the switch and the plurality of input ports, the receiver determining, based on the PVC management information table, a user type associated with a working path through which an incoming packet has been received from one of the plurality of input interfaces, wherein
- when the receiver receives a first packet from a first input interface through a first path that is associated, in the PVC management information table, with the user type of routed corresponding to the IP-VPN,
  - the receiver determines, by referring to the PVC management information table, that the first packet is an IP packet that is received from the first input interface coupled to a physical line for the IP-VPN, the receiver changes the received IP packet into a L2-encapsulated packet by adding, to an outside of the IP packet, a L2 header including MAC addresses and a VLAN address that are stored in the PVC management information table in association with the first path and the user type of routed, and the L2-switch performs L2 switching processing on the L2-encapsulated packet on the basis of the MAC addresses and the VLAN address that are stored in the L2 header added to the received IP packet, so that the received IP packet is sent to a first output interface coupled to a physical line for the IP-VPN; and when the receiver receives a second packet from a second input interface through a second path that is associated, in the PVC management information table, with the user type of bridged corresponding to the L2-VPN, the receiver determines, by referring to the PVC management information table, that the received second packet is a L2 packet that is received from the second input interface coupled to a physical line for the L2-VPN, and the receiver sends the received L2 packet to the L2-switch by setting a VLAN address that is associated with the second path in the PVC management information table, to a L2 header of the received L2 packet, so that the received L2 packet is sent to a second output interface coupled to a physical line for the L2-VPN.

* * * * *